July 11, 1933.  G. B. STARR  1,917,611
PROJECTOR APPARATUS
Filed Jan. 7, 1931  2 Sheets-Sheet 1
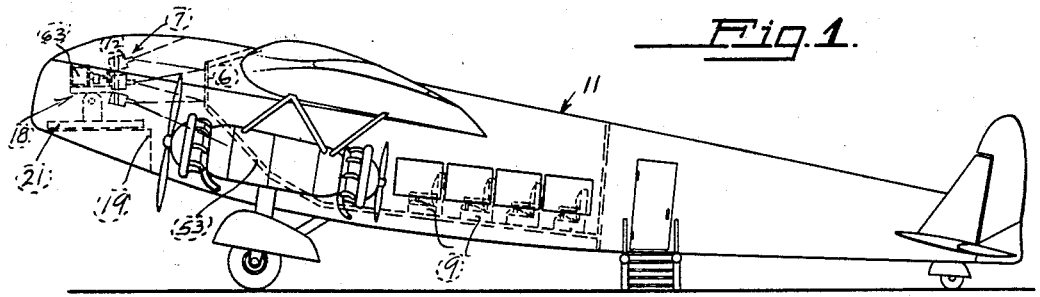
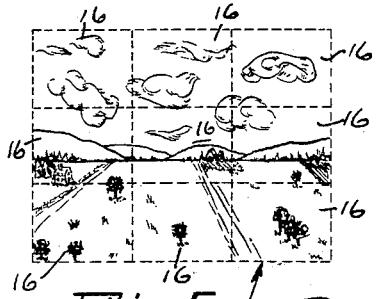
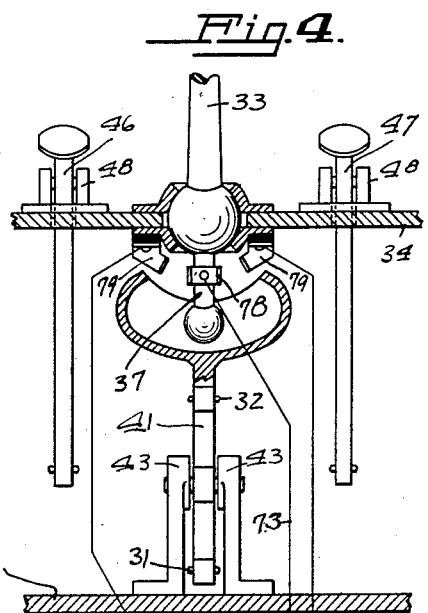
INVENTOR,
GEORGE B. STARR
BY
ATTORNEYS.

July 11, 1933.  G. B. STARR  1,917,611
PROJECTOR APPARATUS
Filed Jan. 7, 1931   2 Sheets-Sheet 2
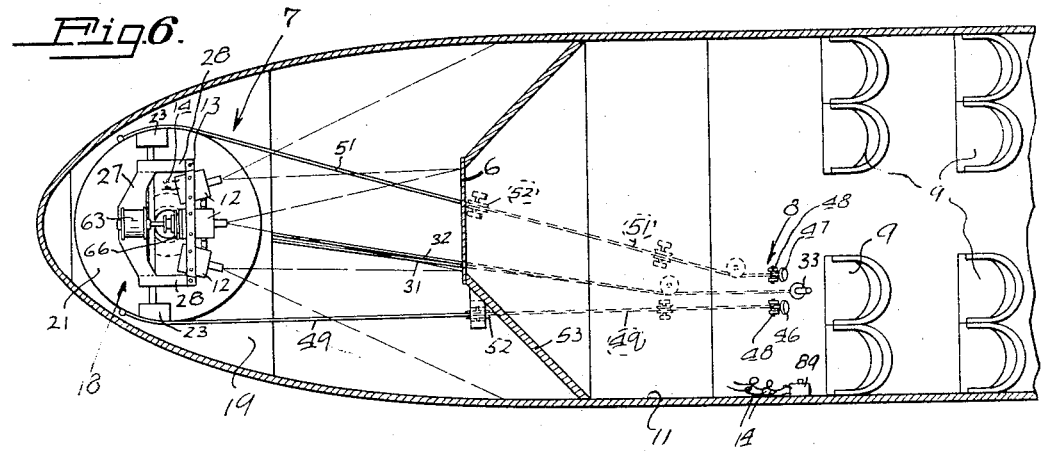
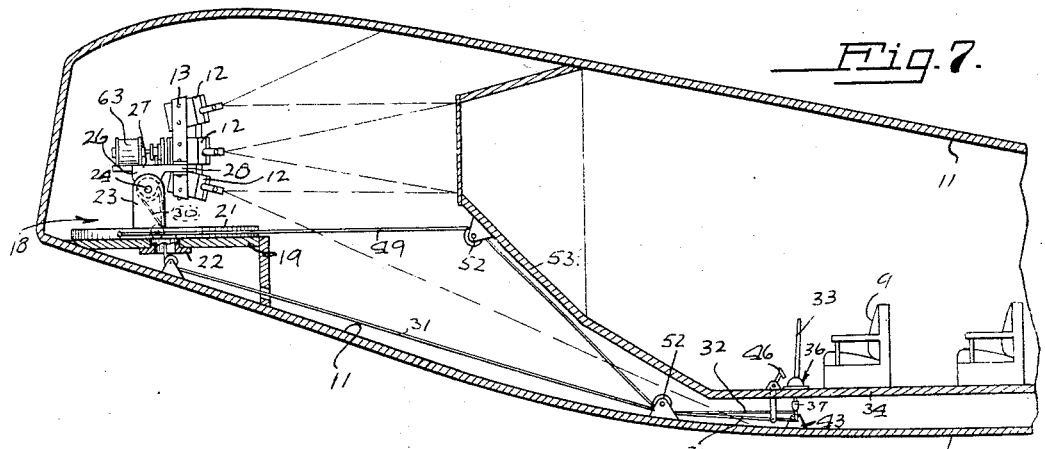
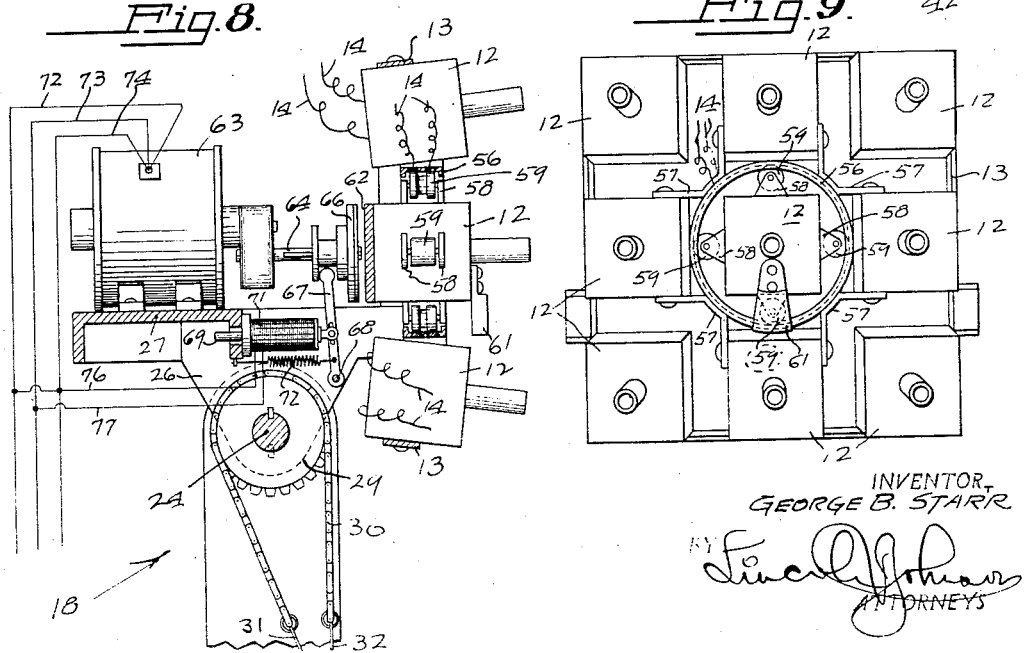
INVENTOR,
GEORGE B. STARR Patented July 11, 1933

1,917,611

UNITED STATES PATENT OFFICE

GEORGE B. STARR, OF SAN FRANCISCO, CALIFORNIA

PROJECTOR APPARATUS

Application filed January 7, 1931. Serial No. 507,139.

This invention relates to picture projecting apparatus.

The primary object of the invention is to provide an apparatus for directing and manipulating a battery of picture projectors relatively to a screen.

Particularly it is an object of the invention to provide an apparatus whereby a plurality of complemental pictures may be selectively projected on a screen in such a manner as to present the illusion of a view seen from inside a traveling aircraft, at various attitudes of the aircraft.

Other objects and advantages are to provide a picture projecting apparatus that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings, wherein

Fig. 1 is a side view of an airplane, with my apparatus therein.

Fig. 2 is a top plan view of the airplane.

Fig. 3 is a sectional detail view of a controlling mechanism of the apparatus.

Fig. 4 is a sectional front view of the controlling mechanism shown in Fig. 3.

Fig. 5 is a diagrammatic view of the entire composite picture projected by the projectors of my apparatus.

Fig. 6 is a sectional plan view of the airplane having my apparatus therein.

Fig. 7 is a sectional side view of the airplane and my apparatus therein.

Fig. 8 is a detail view of the battery of the projector on the support of my apparatus.

Fig. 9 is a front view of the battery of projectors of my apparatus.

Fig. 10 is a sectional detail view of one of the projectors.

Fig. 11 is a fragmental detail of the supporting race of the rotary, center projector.

Fig. 12 is a sectional view of the race and the roller of the center projector, the section being taken on the line 12—12 of Fig. 11.

In carrying out my invention I make use of a screen 6, on one side of which is an adjustable projector apparatus 7 for projecting pictures onto the screen 6. On the other side of the screen 6 are controls 8 for the manipulation of the projectors. There are also seats 9 provided for spectators.

The entire apparatus as well as the seats are in a compartment formed in the shape of a fuselage 11 of an airplane. The outside appearance of the housing is that of an airplane.

The controls 8 in the housing are so connected to the projector apparatus 7 that the pictures projected on the screen 6 can be varied and moved by the manipulation of the controls 8. The controls 8 when manipulated in the usual manner of airplane controls, cause the varying, shifting, and moving of the pictures on the screen so as to present the illusion of a view through a window of an aircraft at various attitudes of the aircraft.

Thus the device may be used as an amusement device, as well as for testing the reaction of persons under various flight attitudes. By slightly vibrating the entire housing 11, the illusion is made so complete that the spectators in the substantially stationary airplane feel the same sensation as if they were in an airplane in flight.

The projector apparatus 7 includes a plurality of moving picture projectors 12 mounted on a frame 13, which supports all the projectors 12 as a unit. In the present illustration there are nine projectors 12, each of which is connected by wires 14 to a source of electricity to be operated thereby in the usual manner. In each projector 12 there is a preferably endless film depicting a moving landscape, which is reeled by the usual moving picture projector mechanism, not shown. The projectors 12 are so arranged that the projections thereof are directed in divergent directions, but toward the plane in which the screen 6 is disposed. The spacing between the projectors 12 and the screen 6 is such that the size of a projected picture at the plane of the screen is substantially the same as the size of the screen 6; in other words, the screen 6 accommodates one picture at a time. The angle of divergence between the projectors 12 is such that the pictures projected by the adjacent projectors 12 complement each other at the plane of the screen 6. The projected pictures, denoted by the reference numeral 16, form a continuous landscape, which is diagrammatically illustrated at 17 in Fig. 5. Each of the pictures 16 is a moving picture in itself, and is preferably reeled off in synchronism with the other pictures and in the same direction. Naturally the entire landscape 17 does not appear on the screen 6 at the same time, only a portion thereof corresponding to the size of one picture 16.

By shifting the entire battery of projectors 12, as a unit, the landscape 17 is moved on the screen 6 in a desired direction. The resulting travel and change of the projected scenery creates the illusion of the traveling of the aircraft relatively to scenery in a direction opposite to the shifting of the landscape 17 on the screen 6.

In order to provide for all the attitudes of flight of an airplane the frame 13 is mounted on a support 18 adjustable around two axes, namely around a vertical axis and a horizontal axis parallel with the screen 6. The support 18 includes a base 19 fixed on the fuselage housing 11, on which base 19 is disposed a horizontal disc 21, a hollow hub 22 of which latter is journaled in the base 19 to allow rotation of the disc 21 around its center. From the top of the disc 21 extend aligned vertical bearing brackets 23 in which is journaled a horizontal pin 24 parallel with the screen 6. On the pin 24 are fixed the lugs 26 of a platform 27, on the legs 28 of which is fixedly mounted the frame 13. Between the lugs 26 is disposed a sprocket 29 keyed on the pin 24, on which sprocket 29 is a chain 30. The ends of the chain 30 are connected to actuating control lines 31 and 32 respectively.

The controls 8 include a joy stick 33 universally mounted on the floor 34 of the fuselage 11, by means of a ball and socket joint 36. An arm 37 thereof extends below the joint 36 and terminates in another ball 38 engaging a transversely elongated socket 39 on the end of a normally vertical lever 41 between the floor 34 and the bottom 42 of the fuselage 11. The lever 41 is pivoted intermediate its ends on a fixed bracket 43, so as to be swingable fore and aft oppositely to the swinging of the stick 33. The control line 31 is connected to the lever 41 below the fulcrum thereof, and the control line 32 is connected to the lever 41 above the fulcrum of the latter. The lines 31 and 32 extend through the aperture of the disc hub 22 and are guided by suitable sheaves or pulleys. When the stick 33 is moved forward, as usual for a nose dive, or the like, the line 31 is pulled rearwardly so as to cause the chain 30 to turn the sprocket 29 in a contra-clockwise direction, viewing Fig. 8. In this manner the platform 27 is turned so as to move the battery of projectors 12 upwardly relatively to the screen. The upward shifting of the landscape gives the illusion of the nose dive.

By moving the stick 33 rearwardly, as usual for bringing an aircraft into a climbing attitude, the line 32 is pulled and the sprocket 29 is rotated in a clockwise direction viewing Fig. 8, so that the landscape 17 is shifted downwardly on the screen 6, creating the illusion of a climbing attitude of the airplane. Normally the sprocket 29 is held against rotation by holding or locking the stick 33 in the desired position.

The controls 8 also include pedal levers 46 and 47, pivoted on brackets 48 on the floor 34 and extended below the latter. A cable 49 or the like line, is connected at an end thereof to the lower end of the pedal lever 46, and at its other end to the periphery of the disc 21. Another cable 51 is secured at one end thereof to the lower end of the pedal lever 47, and at its other end to the periphery of the disc 21 on the side opposite to the securing point of the first cable 49. It is to be noted that both cables 49 and 51 are secured to the disc periphery beyond the location of the respective brackets 23 so as to offer leverage for turning the disc whenever one of the said pedal levers is depressed. The cables 49 and 51 are guided on suitable pulleys 52 mounted on a partition 53 of the fuselage 11, the latter substantially corresponding to an instrument board of a standard airplane.

It is to be noted that the partition 53 divides the fuselage 11 in two compartments on the opposite sides of the screen 6, one for the spectators, and the other for the projecting apparatus 8. The screen 6 is of the usual transparent screen material.

When the pedal levers 46 and 47 are actuated, the whole battery of projectors 12 is turned with the disc 21, shifting the landscape 17 transversely to the screen 6, so that it gives the illusion of scenery passed by an airplane in flight while banking.

In order to create an impression of a rolling airplane, one of the projectors 12, preferably in the center of the battery of projectors, is supported rotatably around the axis of its projection, and is adapted for connecting to a driving mechanism. An annular race 56 of channel cross section is mounted on the adjacent fixed projectors 12 by means of brackets 57. From the sides of the central projector extend ears 58 in which rollers 59 are journaled. The rollers 59, are disposed in opposed pairs at right angles to each other and ride in the annular channel race 56. A balance weight 61 depends from the rotatable projector 12, outside of the race, to operate as a pendulum and urge the rotatable projector 12 to its normal vertical position. On the rear side of the rotatable projector 12 is a friction facing 62. On the platform 27 is mounted an electric motor 63 from which extends a drive shaft 64, on which latter in turn, is slidably keyed a friction clutch disc 66 opposite the facing 62. The hub of the disc 66 has a groove around its periphery engaged by a lever 67, the latter being pivoted on a shaft 68 extended from the lugs 26. A solenoid core 69 is pivotally connected to the lever 67 intermediate the ends of the latter, and is extended through a solenoid coil 71 mounted on the platform 27. A spring 72 urges the lever toward the motor 63. The core 69 is so balanced that its longer effective portion protrudes beyond the rear end of the coil 71 when the clutch is disengaged.

Whenever the solenoid 71 is energized, the lever 67 urges the clutch disc 66 into frictional engagement with the facing 62 to transfer rotary movement from the motor 63 to the central projector 12. When the central projector 12 is aligned with the screen 6, and it is rotated in either direction, then the scenery on the screen is rotated as if it was a landscape seen from an airplane put through a roll.

The motor 63 is a reversible motor of the usual type, and to its wire connections 72, 73 and 74 are connected the wires 76 and 77 of the solenoid 71 so that whenever the motor circuit is closed, the solenoid 71 is also energized to apply the clutch 66. For this purpose the wire 76 is connected to both wires 72 and 74, while 77 is connected to the neutral wire 73.

Each projector 12 has therein the usual shutter mechanism at the lens 88, and the motor 86 is connected to the wheel 84 thereon by an intermittent driving mechanism which operates in synchronism with the shutter in the usual manner of moving picture cameras.

The motor 63 is rendered operative by the swinging of the stick 33 sidewise, similarly to the control of the ailerons of a usual airplane. On the arm 37 is a switch contact 78 connected to the wire 74 of the motor 63, and insulated from the arm 37. On each side of the arm 37 is a stationary switch contact 79 to be contacted by the contact 78 when the arm 37 is swung in the respective directions. The stationary contacts 79 are connected through conduits and sources of electricity to the wires 72 and 74 respectively, so that the wires 72 and 74 receive currents from opposite poles of the source of electricity. Thus the motor 63, and the center projector 12 can be rotated in either direction.

The projectors 12 may be constructed in any customary manner, such as illustrated in Fig. 10. In a projector casing 81 is disposed an endless film 82 guided on rollers 83 and driven by the usual toothed wheels 84. One of the wheels 84 is rotated by a motor 86 mounted inside of the projector 12. The wheels 84 are so arranged as to pass the film between a light 87 and the projector lens 88. The wires 14 connecting the motor 86 extend outside of the casing 81. All the wires 14 are suitably connected together to a source of electricity and to a suitable switch 89 in the fuselage 11 near the controls 8, so that all the projectors 12 can be rendered operative simultaneously. The light 87 of each projector 12 is connected in parallel to the wires 14 of the projector 12.

In view of the fact that the center projector 12 is rotatable, I provide a pair of parallel conducting rings 91 in the bottom of the channel 56. The channel 56 is of insulating material, or the conducting rings are otherwise insulated therefrom. To the conducting rings 91 are connected the respective lead-in wires 14. One of the rollers 59 has two conductor sections 92 and an intermediate insulating section 93 between the conductor sections 92. The ears 58 at this last mentioned roller 59 are suitably insulated from each other and from the casing 81 and are connected to the terminals of the motor 86 and the light 87 of the center projector 12. Thus, electric current is transmitted to the center projector 12 both when stationary or when rotating.

In operation, the operator turns "on" the switch 89, thus closing the circuit of all the motors 86 and the lights 87 thereby rendering the same operative. Then by manipulating the control stick 33 and the pedal levers 46 and 47, the desired portions of the landscape 17 are brought in view on the screen 6. The speed and direction of the movement of the landscape 17 on the screen 6 creates the illusion of viewing a scene through a window from an aircraft in flight. The operator manipulates the controls similarly to the handling of the usual airplane controls. To put the airplane into a dive the stick 33 is pushed forward whereby the landscape is shifted upwardly. To simulate a climbing attitude the stick 33 is pulled rearwardly, toward the seats 9, thereby shifting the scene downwardly, as it would appear from an airplane in flight. In banking to one side or the other, the respective pedals 46 or 47 are depressed to rotate the disc 21 and move the projected landscape 17 sidewise. To create the impression of rolling movement of an aircraft, the operator moves the stick 33 sidewise, as if to adjust the ailerons of an airplane, thereby closing the circuit of the motor 63 and of the solenoid 71 to rotate the center projector 12 in the desired direction.

The connections between the controls and the adjustments of the support 18 are such that the movement of the controls 8, in the standard manner for airplanes, results in an adjustment of the support and the shifting of the pictures in a direction corresponding to the actual appearance of the landscape during the respective attitudes of an aircraft.

During all the adjustments and manipulation, the individual pictures 16 change in synchronism by reason of the reeling of the endless films 82. The films are so selected that the adjacent projections complement each other to form a continuous landscape. All the films are reeled in the same direction. If the screen 6 represents a side window then all the films are reeled across the projecting camera. If the screen 6 represents a bottom window, or a front window, the films are reeled off from the top toward the bottom of the projector in front of the light 87.

Thus it will be recognized that a perfect illusion of a view from a flying aircraft is created in a stationary compartment. The various movements may be combined to produce not only the sensation of straight flight, pitching, banking, yawing, and barrel rolls in either direction, but also to produce a traveling landscape, creating the impression of a combination of the first mentioned attitudes of aircrafts, such as left upward bank, right upward bank, left tail spin, or right tail spin, and the like; such complex adjustments are simply achieved by the simultaneous adjustment of the support around both axes of its adjustment merely by operating more than one control device at the same time; the arrangement of the horizontal and vertical series of projectors on horizontal and vertical arcs respectively, to cause the proper divergence of the directions of the projection thereof, gives true perspective and depth to the landscape passing by on the screen.

Having thus described this invention, what I claim and desire to secure by Letters Patent is:

1. In a device of the character described, a screen, a battery of moving picture projectors projecting in divergent directions toward the plane of the screen, the pictures projected from the adjacent projectors complementing each other, an adjustable support for the projectors, and means to move the support to various positions to bring selected projectors into operative relation to direct the projection from the same onto the screen.

2. In a device of the character described, a screen, a battery of moving picture projectors projecting in divergent directions toward the plane of the screen, the pictures projected from the adjacent projectors complementing each other, an adjustable support for the projectors, and means to move the support to various positions to move all the projectors as a unit relatively to the screen so as to bring selected projectors into operative relation to direct the projection from the same onto the screen.

3. In a device of the character described, a screen, a battery of moving picture projectors projecting in divergent directions toward the plane of the screen, the pictures projected from the adjacent projectors complementing each other, an adjustable support for the projectors, means to move the support to various positions to bring selected projectors into operative relation to direct the projection from the same onto the screen; means on the support to rotatably mount one of the projectors in place, means to rotate said last mentioned projector substantially around the axis of its projection, and means to render said rotating means operative at will.

4. In a device of the character described a screen, a battery of moving picture projectors projecting in divergent directions toward the plane of the screen, the pictures projected from the adjacent projectors complementing each other, an adjustable support for the projectors, means to move the support to various positions to move all the projectors as a unit relatively to the screen so as to bring selective projectors into operative relation to direct the projection from the same onto the screen; means on the support to rotatably mount one of the projectors in place, means to rotate said last mentioned projector substantially around the axis of is projection, and means to render said rotating means operative at will.

5. The combination with a screen, of a plurality of moving picture projectors, a support on which the projectors are arranged so as to project in diverging directions toward the plane of the screen, the picture projected by adjacent projectors complementing each other; and means to move all the projectors as a unit to selectively direct the projections issuing from the various projectors onto the screen.

6. The combination with a screen, of a plurality of moving picture projectors, a support on which the projectors are arranged so as to project in diverging directions toward the plane of the sceen, the pictures projected from adjacent projectors complementing each other; and means to adjust the support to move all the projectors as a unit about two axes to direct the projections issuing from selected projectors onto the screen.

7. The combination with a screen of a plurality of moving picture projectors, a support on which the projectors are arranged so as to project in diverging directions toward the plane of the screen, the pictures projected by an adjacent projector complementing each other; means to move all the projectors as a unit to selectively direct the projections issuing from the various projectors onto the screen, means moving with the projectors as a unit, to support one of the projectors rotatably around the axis of projection of the latter; means to impart rotation to said last mentioned projector; and means to render said rotating means operative at will.

8. A battery of projectors, in combination with a screen, and a support to unite the projectors so as to project in divergent directions toward the screen, the screen being of such dimensions as to accommodate a picture projected from one of the projectors at a time, and means to adjust the united projectors to selectively bring the projectors into operative relation to the screen.

9. A battery of projectors united together for unitary movement around two axes, in combination with a screen, the projectors being arranged to project complemental pictures in divergent directions toward the plane of the screen, the latter accommodating one picture at a time, and means to move the united projectors around either one or both of said axes.

10. A plurality of series of moving picture projectors combined in a unit so as to project complemental pictures in divergent directions toward the same plane, in combination with a screen in said plane to accommodate one of said pictures, an adjustable support for the said unit; and means to adjust the support to bring selected projector into alignment with the screen.

11. In combination with a screen, a moving picture projector, a support, means to mount the projector on the support rotatably about the axis of projection, means to impart rotation to the projector, and means to render the rotating means active at will.

12. In combination with a screen, a moving picture projector, a support, means to mount the projector on the support rotatably about the axis of projection, means to impart rotation to the projector; means to render the rotating means active at will, said support being adjustable around two axes, and means to selectively move the support around said axes.

13. A moving picture projector, means to support said projector rotatably around its axis of projection, means to rotate the projector, and means to render said rotative means operative at will.

14. In combination a support adjustable around two axes, a frame on the support, a plurality of projectors arranged on the frame to project complemental pictures in divergent directions toward the same plane, a screen in said plane corresponding to the size of one of said pictures, and a remote control mechanism to selectively adjust the support around the said axes to cause selected pictures to come into view on the screen.

15. In combination a support adjustable around two axes, a frame on the support, a plurality of projectors arranged on the frame to project complemental pictures in divergent directions toward the same plane, a screen in said plane corresponding to the size of one of said pictures, a remote control mechanism to selectively adjust the support around the said axes to cause selected pictures to come into view on the screen, means in the frame to support one of the projectors rotatably around its axis of projection, means to rotate the last mentioned projector, and means to render the rotating means operative at will.

16. In combination a support, a member thereon rotatable on the support, a bracket on the member, a swingable supporting element on the bracket, a frame on said element, a plurality of projectors mounted on the frame to project complemental pictures in divergent directions to one side of the support; a screen disposed to accommodate one of said pictures, a control mechanism, and means of connection between the control mechanism and the said supporting member and said element to move the projectors so as to change the complemental pictures on the screen so as to create the illusion of passing by a natural scenery.

17. A plurality of series of moving picture projectors combined in a unit so as to project complemental pictures in divergent directions toward the same plane, in combination with a screen in said plane to accommodate one of said pictures, an adjustable support for the said unit, a control mechanism, and means of connection between the control mechanism and the said adjustable support to transfer movement from the controls to the support thereby to cause the changing of the complemental pictures on the screen so as to create an illusion of motion relatively to natural views.

18. The combination with a screen, of a plurality of moving picture projectors, a support on which the projectors are arranged so as to project in diverging directions toward the plane of the screen, the pictures projected by adjacent projectors complementing each other; means to move all the projectors as a unit to selectively direct the projections issuing from the various projectors onto the screen, means moving with the projectors as a unit to support one of the projectors rotatably around the axis of projection of the latter; means to impart rotation to said last mentioned projector; means to render said rotating means operative at will; and a control mechanism, said last mentioned means being connected to said control mechanism to transfer movement to the support and so actuate said rotating means as to cause the traveling of the complemental pictures on the screen to create an illusion of motion relatively to natural views.

In testimony whereof, I have hereunto set my hand at San Francisco, California, this 2nd day of January, 1931.

GEORGE B. STARR.